(No Model.)
J. S. BROOKS.
COMBINED BAIL AND COVER FOR VESSELS.
No. 600,508. Patented Mar. 15, 1898.
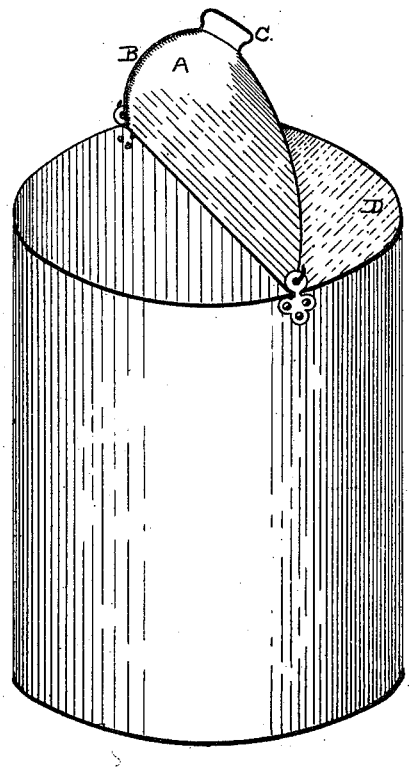
WITNESSES:
Walter M. Coots.
E. M. Vinleri
John S. Brooks
INVENTOR

UNITED STATES PATENT OFFICE.

JOHN S. BROOKS, OF BROOKLYN, NEW YORK.

COMBINED BAIL AND COVER FOR VESSELS.

SPECIFICATION forming part of Letters Patent No. 600,508, dated March 15, 1898.

Application filed February 23, 1897. Serial No. 624,572. (No model.)

*To all whom it may concern:*

Be it known that I, JOHN S. BROOKS, a citizen of the United States, residing at Brooklyn, in the county of Kings and State of New York, have invented a new and useful Cover for Vessels, of which the following is a specification.

My invention relates to covers for vessels, especially garbage-cans, which are especially liable to have an ordinary detachable cover lost or left off from the vessel by the carelessness of servants and which for sanitary reasons should be kept covered.

I have provided a cover as shown by the accompanying drawing, which is a perspective view of my device applied to an ordinary ash-can.

The cover A is made to extend over one-half or more of the opening of the can, or it may be made in two equal parts, both alike and open the entire diameter of the can or vessel. To provide strength and for convenience in handling, I attach the cover to the bail of the vessel, as shown in the drawing, at B, where the bail of the vessel forms the edge of the cover to stiffen it and is hooked to the ears of the vessel. At the outer edge of the cover the bail is so bent as to form a handle to lift the can when it is carried from place to place, as shown at C. Unless two covers are used the space at the back of the cover is closed by a half-circular cover permanently attached to the vessel, as shown at D.

In the manufacture of garbage-cans for which my invention is of especial value the metal best adapted is galvanized sheet-iron. These cans are kept in some convenient place near a kitchen until filled, when they are carried to the street to await the arrival of the garbage-wagon. When the cover is not permanently attached, it gets lost or left off by carelessness and the vessels are exposed with their contents in the streets, giving an offensive odor to the air. On account of the rough handling garbage-cans are subjected to a permanent cover would soon become loosened if made in the ordinary way, having only a hinge at the edge. My cover, being attached to the bail, is not only very strong, but it serves a twofold purpose of cover and bail and can only be loosened or detached by the same strain that would detach the bail and is very cheaply made.

What I claim, and desire to secure by Letters Patent, is—

1. A cover for garbage-cans and other vessels in which the cover A and the bail B are combined in one part, the bail at the middle thereof being bent away from the cover to form a handle C and the ears for the bail serving as hinges for the cover when attached to the bail.

2. A cover for garbage-cans and other vessels in which the cover A and bail B are combined in one part, the ears for the bail serving as hinges for the cover when attached to the bail, and a handle formed upon the uppermost part of the bail.

JOHN S. BROOKS.

Witnesses:
WALTER M. COATS,
E. M. VINTEN.